(12) United States Patent
Borlodan et al.

(10) Patent No.: US 10,961,752 B2
(45) Date of Patent: Mar. 30, 2021

(54) MOTOR VEHICLE LATCH

(71) Applicant: Kiekert AG, Heiligenhaus (DE)

(72) Inventors: Stelian Borlodan, White Lake, MI (US); Keith Robertson, Livonia, MI (US); Jim Zhuang, Canton, MI (US)

(73) Assignee: Kiekert AG, Heiligenhaus (DE)

( * ) Notice: Subject to any disclaimer, the term of this patent is extended or adjusted under 35 U.S.C. 154(b) by 690 days.

(21) Appl. No.: 15/709,520

(22) Filed: Sep. 20, 2017

(65) Prior Publication Data

US 2019/0085602 A1    Mar. 21, 2019

(51) Int. Cl.
*E05B 85/02*   (2014.01)
*E05B 77/04*   (2014.01)
*B60N 2/36*    (2006.01)
*E05B 85/26*   (2014.01)

(52) U.S. Cl.
CPC .............. *E05B 85/02* (2013.01); *B60N 2/366* (2013.01); *E05B 77/04* (2013.01); *E05B 85/26* (2013.01); *Y10S 292/23* (2013.01); *Y10T 292/108* (2015.04); *Y10T 292/1047* (2015.04); *Y10T 292/1082* (2015.04); *Y10T 292/1092* (2015.04); *Y10T 292/62* (2015.04)

(58) Field of Classification Search
CPC .......... E05B 85/02; E05B 77/10; E05B 77/04; E05B 85/26; Y10T 292/62; Y10T 292/108; Y10T 292/1092; Y10T 292/1047; Y10T 292/1082; B60N 2/366; Y10S 292/23

See application file for complete search history.

(56) References Cited

U.S. PATENT DOCUMENTS

| | | | |
|---|---|---|---|
| 6,375,234 B1* | 4/2002 | Brackmann | E05B 77/34 292/1 |
| 6,557,913 B1 | 5/2003 | Kunst | |
| 2005/0241133 A1* | 11/2005 | Cetnar | E05B 85/02 29/527.1 |
| 2006/0097523 A1* | 5/2006 | Cetnar | E05B 85/26 292/216 |
| 2006/0170224 A1 | 8/2006 | Mitchell | |

(Continued)

FOREIGN PATENT DOCUMENTS

| | | |
|---|---|---|
| DE | 20 2012 007 326 U1 | 11/2013 |
| DE | 102014210165 A1 | 8/2015 |

(Continued)

OTHER PUBLICATIONS

International Search Report and Written Opinion issued on related PCT application.

*Primary Examiner* — Kristina R Fulton
*Assistant Examiner* — Faria F Ahmad
(74) *Attorney, Agent, or Firm* — Renner, Otto, Boisselle & Sklar, LLP

(57) ABSTRACT

The object of the invention is a motor vehicle latch demonstrating a locking mechanism comprising a catch and at least a pawl, a latch plate (1), whereby the locking mechanism can be accommodated in the latch plate (1) and the latch plate (1) demonstrates an inlet area (12), whereby a latch holder (13) can be inserted to interact with the locking mechanism in the inlet area (12) and with at least a deformation (11) formed in a peripheral area of the inlet area (12) in the latch plate (1), whereby the deformation (11) is arranged at least in places directly on an edge of the inlet area (12).

11 Claims, 1 Drawing Sheet

(56) References Cited

U.S. PATENT DOCUMENTS

| | | | |
|---|---|---|---|
| 2009/0236863 A1* | 9/2009 | Akizuki | E05B 81/14 |
| | | | 292/201 |
| 2011/0031765 A1* | 2/2011 | Vazquez | E05B 85/26 |
| | | | 292/217 |
| 2011/0204690 A1* | 8/2011 | Torkowski | E05B 85/26 |
| | | | 297/354.12 |
| 2011/0316293 A1* | 12/2011 | Luschper | E05B 79/20 |
| | | | 292/195 |
| 2013/0199103 A1* | 8/2013 | Raschegewski | B23P 19/047 |
| | | | 49/506 |
| 2013/0300137 A1* | 11/2013 | Akizuki | E05B 85/26 |
| | | | 292/337 |
| 2015/0204117 A1 | 7/2015 | Mittelbach | |
| 2016/0177599 A1* | 6/2016 | Nozawa | E05B 85/243 |
| | | | 292/58 |
| 2016/0265255 A1* | 9/2016 | Mazal | E05B 83/18 |
| 2016/0290020 A1* | 10/2016 | Nozawa | E05B 77/38 |
| 2016/0290021 A1* | 10/2016 | Nishio | E05B 85/26 |
| 2016/0362916 A1* | 12/2016 | Tomaszewski | E05B 81/76 |
| 2018/0016820 A1* | 1/2018 | Takagi | E05B 15/16 |
| 2018/0216370 A1* | 8/2018 | Ishiguro | E05B 77/34 |
| 2019/0277069 A1* | 9/2019 | Lim | E05B 79/20 |
| 2020/0011094 A1* | 1/2020 | Guevara Arreola | |
| | | | E05B 15/1635 |

FOREIGN PATENT DOCUMENTS

| | | |
|---|---|---|
| DE | 10 2015 116 805 A1 | 6/2016 |
| EP | 2862995 A1 | 4/2015 |
| WO | 2017/054790 A1 | 4/2017 |

\* cited by examiner ns to demonstrate sufficient safety. The option now exists of setting a motor vehicle latch apart from the state of the art with the design of the motor vehicle latch according to the invention, since by means of the deformation arranged directly on an edge of the recess, or instead by means of the molds, the option now exists to also absorb forces in the motor vehicle transverse direction which cannot be absorbed by reinforcing plates known from the state of the art.

MOTOR VEHICLE LATCH

The invention relates to a motor vehicle latch demonstrating a locking mechanism comprising a catch and at least a pawl, a latch plate, whereby the locking mechanism can be accommodated in the latch plate and the latch plate demonstrates a recess, whereby a latch holder can be inserted into the recess to interact with the locking mechanism and with at least a deformation formed in a peripheral area of the recess, in particular a bead, in the latch plate.

BACKGROUND

Latches which retain the moving parts on the motor vehicle in their specified position are used to close motor vehicle doors, flaps or sliding doors, to name just a few examples. Normally, the latch systems or latches demonstrate a locking mechanism, consisting of a catch and at least a pawl which can be ratcheted into one another in order for example to encompass a latch holder attached to the motor vehicle chassis in order to thus, for example, retain a motor vehicle door in its position.

The locking mechanism, catch and pawl are pivotably accommodated on a latch plate, whereby the latch plate and the locking mechanism part axes incorporating the locking mechanism parts are made of metal, in particular steel. Due to the locking mechanism and the bearing parts of the latching system being made of steel, the latching system is capable of guaranteeing sufficient stability and thus safety even in extreme situations. Extreme situations for a latching system of a motor vehicle occur, for example, in the case of an accident, whereby the latching systems can be stressed beyond a multiple of the usual stresses.

In order to guarantee sufficient safety in these extreme situations too, tensile tests are performed in which the motor vehicle latches are subjected to a stress occurring in an accident. Under these simulated extreme conditions, the motor vehicle latches are subjected to tensile stress until failure of the locking mechanism. Failure means, for example, during tensile stress between the latch holder and the locking mechanism in the direction of the locking mechanism plane the latching unit comprising a motor vehicle latch and a latch holder are pulled apart until failure occurs of one of the components of the motor vehicle latch and/or the latch holder. To enable a latching unit to be used in the motor vehicle the latching unit must withstand tensile stress above the specifications of the car manufacturer before failure of one or several components of the latching unit occurs. In order to conform to the requirements of the motor vehicle manufacturer, different solutions have become known to stabilize a latch plate and/or a motor vehicle latch.

DE 20 2012 007 326 U1 discloses a motor vehicle latch with a latch case, furthermore with a locking mechanism accommodated in the latch case comprising a catch and a pawl and with an additional reinforcing element, whereby the reinforcing element is formed as a reinforcing plate connecting both rotational axes of both the catch and the pawl at a distance from the latch case. The latch case or the latch plate, it being pointed out that the latch case and latch plate can be used as synonyms, is U-shaped in the cross-section. As the legs of the U-shaped latch case are arranged fundamentally vertically to the motor vehicle transverse direction or y-direction, the specification of the latch case ensures that the rectangular supporting structure is arranged vertically to this y-direction. Any forces in this motor vehicle transverse direction are thus absorbed by the locking mechanism or the supporting structure and are introduced into this latch case. The latch case and reinforcing plate hereby from a storage cage for the locking mechanism. Consequently, deformation forces can be resiliently absorbed in the case of a crash.

From DE 10 2015 116 805 A1 a generic motor vehicle latch has become known demonstrating a locking mechanism comprising at least a catch and a pawl and a latch plate, whereby the catch and the pawl are pivotably accommodated on the latch plate and the latch plate demonstrates at least two apertures for mounting of the motor vehicle latch which demonstrates an inlet slot for a latch holder and whereby a splay opposite the inlet slot is provided for on the latch plate and the splay demonstrates at least a semi-circular end area opposite the inlet slot. The latch plate which is predominantly flat demonstrates deformations in the form of beads which extend around a recess, at least in places. The recess serves as an inlet area for a latch holder. The recess can also be described as an infeed section. In addition to the beads formed in the flat surface of the latch case, the latch plate demonstrates a splay arranged circumferentially at least in places which enables stabilization of the latch plate in the case of extreme stress.

A problem always posed in the further development of motor vehicle latches is that on the one hand safety which fulfills requirements needs to be guaranteed to enable the specified stress limitations to be attained. On the other hand, the automotive industry is striving to make motor vehicles lighter overall.

SUMMARY OF THE INVENTION

The task of the invention is to provide an improved motor vehicle latch. Furthermore, the task of providing a motor vehicle latch consists on the one hand of conforming to the safety requirements and stresses from the automotive industry's specifications and on the other hand simultaneously enables a significant increase in stress limitations of the motor vehicle latch, whereby this can simultaneously be attained by complying with a weight increase which is as small as possible or instead with weight-saving. Furthermore, the task of the invention is to provide a motor vehicle latch of a simple construction which is cost-effective.

According to the invention, the task is solved by the characteristics of the independent claim 1. Advantageous designs of the invention are stated in the sub-claims. It is pointed out that the execution examples described below are not restrictive, instead any variation of the characteristics described in the description and the sub-claims is possible.

According to patent claim 1, the task of the invention is solved by a motor vehicle latch being provided demonstrating a locking mechanism comprising a catch and at least a pawl, a latch plate, whereby the locking mechanism can be accommodated in the latch plate and the latch plate demonstrates a recess, whereby a latch holder can be inserted into the recess to interact with the locking mechanism and with at least a deformation formed in a peripheral area of the recess, in particular at least a bead, in the latch plate, whereby the deformation is arranged at least in places directly on an edge of the recess. The design of the motor vehicle latch according to the invention now gives the option of providing an improved motor vehicle latch which can absorb increased or higher stresses with comparable dimensions and material costs. By the molds directly on an edge of the recess, the latch plate can be reinforced overall. A reinforcement of the latch plate is significant in particular in relation to extreme stress. Extreme stresses occur when the latch, such as in the case of an accident, for example, needs to absorb forces beyond the usual stresses. Preferably, this stress is measured to the extent that the latch holder engaging with the locking mechanism is pulled out of the engagement of the locking mechanism under tensile stress. This can occur in an accident or also in the development of a motor vehicle latch, to the extent that the latch is subjected to tensile stress in a test.

The latch holder is preferably removed from the motor vehicle latch in the direction of its relative movement to the locking mechanism or motor vehicle latch. In motor vehicle lateral door latches this stress direction is a stress direction which corresponds to an opening of a lateral door. Moving the latch out of the latch holder attached to the C-pillar, for example, is preferably defined as a y-direction. In the case of a stress of the motor vehicle latch in the y-direction a relative movement is initialized between the latch holder and the motor vehicle latch in such a way that a relative movement between the latch and the latch holder can be simulated for the purpose of an accident.

By inserting the deformation into the direct peripheral area of the recess, i.e. the infeed section or the inlet slot in the latch plate a significant increase in the tensile strength can be attained in the y-direction. According to the invention, the deformation is arranged on the recess, at least in places. The deformation thereby stabilizes the latch plate and in particular stabilizes the periphery of the recess. Stabilization of the periphery of the recess has a stabilizing effect on the bearing points of the locking mechanism parts which are preferably present at a distance from the recess in the latch plate. For example, the bearing points can be molded as borings into the latch plate.

If a motor vehicle latch is spoken about in the context of the invention, lateral door latches, sliding door latches, hood latches and also tailgate latches are meant. All of those motor vehicle latches can be exposed to extreme stresses, as can occur in an accident, for example. The invention preferably relates to motor vehicle latches with a catch and at least a pawl which are arranged engaging into one another on a joint latch plate, i.e. a basically flat base plate. The catch and the at least one pawl form a locking mechanism which interacts with the latch holder or locking bolt. According to the invention, a latch holder can be designed on the one hand as a bracket-shaped latch holder and also, for example, a locking bolt can be executed as a bolt. This includes both designs. The latch holder can be mounted on the chassis and the motor vehicle latch mounted on a lateral door, for example. However, a relevantly reverse mounting is also possible. The catch and the pawl form the locking mechanism and can be mounted in a plane parallel to the latch plate in a pivoting manner on the latch plate.

On an open motor vehicle latch, an infeed section of the catch lies opposite the latch holder. Consequently, when the motor vehicle latch is closed the latch holder can engage with the infeed section of the catch. Consequently, the latch holder is able to rotate or pivot the catch and transfer it into a latching position. In the latching position, the pawl engages with the catch, whereby a pre-ratchet position and/or a main ratchet position of the locking mechanism can be attained.

A stress direction of the motor vehicle latch lies in the motor vehicle transverse direction, for example. A direction transverse to the motor vehicle is also described as a y-direction. If the motor vehicle latch relates to a lateral door, for example a driver's door, a disproportionately great stress can be exerted on the motor vehicle latch in a y-direction during an accident. The locking mechanism of the motor vehicle latch is also stressed in a y-direction and is preferably parallel to the latch plate, and also parallel to the locking mechanism. In particular during stressing of the motor vehicle latch in a direction parallel to the latch plate or parallel to the locking mechanism the deformation has a stabilizing effect on the motor vehicle latch in the periphery of the recess.

In one design of the invention, an advantage is then attained if the deformation is arranged fully on the periphery of the recess and surrounds the recess. A deformation surrounding the infeed section stabilizes the latch plate to the extent that the areas of the latch subject to high stress are stabilized. In a usual latching movement of the latch, the locking mechanism parts pivot around the locking mechanism part axes incorporated in the latch plate, whereby the locking mechanism parts are incorporated in the latch in a freely pivotable manner. The tolerances for a freely moving pivoting of the locking mechanism parts are precisely aligned in such a way that in places and in particular in the latching positions of the locking mechanism an adjacency of the locking mechanism parts on the latch plate can occur.

In particular, the catch and/or the pawl can become adjacent on the deformation in the infeed section of the latch plate. The deformation therefore fulfills several functions. On the one hand, the deformation in the latch plate has a stabilizing effect on the latch plate and thus on the accommodation of the locking mechanism parts and the deformation also serves to brace the engaged locking mechanism parts. The circumferential design of the deformation on the periphery of the infeed section has an especially advantageous impact as hereby stabilization or an increase in resistance is experienced in the most highly stressed areas, especially in areas highly stressed in the case of accident. In one execution form of the invention, the deformation demonstrates a first splay. Deformation in the case of splays can easily be produced and thus offers the advantage of cost-effective stabilization of the latch plate. In particular, the splay can simultaneously act as a contact surface for the locking mechanism parts. Consequently, bracing of the locking mechanism parts can be enabled during pivoting and/or in the pre- and main ratchet position. In addition to the insertion of beads into a collecting surface, inserting a splay into the latch plate gives the option of additionally stabilizing the latch plate. The latch plate can thus, for example, demonstrate in the area of the mountings of the locking mechanism part axes, the mounting areas, a peripheral area and in the area of the infeed section. Dependent on the necessary increase in stability, according to the insertion of the deformation into the area of the infeed section, an additional option to stabilize the latch plate and thus the latch overall is attainable.

If the first splay is formed in the direction of the locking mechanism parts, an advantageous design variant of the invention thus results. By means of a splay in the direction of the locking mechanism parts and on the circumference of the infeed section or in the movement area of the locking mechanism parts the splay can be designed so as to adapt to the movement and position of the locking mechanism parts. On the one hand, the splay can act as a guide for the locking mechanism parts and at the same time be designed in such a way that the splay in the pre-ratchet position and/or the main ratchet position has a bracing effect on the locking mechanism parts and thus increases resistance. In particular, splays provide a brace. Consequently, the locking mechanism parts, the locking mechanism part axes and the latch plate form a self-contained system. A closed system must be regarded as a connection between the latch plate, the locking mechanism part axis and the locking mechanism part. On the one hand, the locking mechanism part, catch or pawl is incorporated in the locking mechanism part axis or catch axis and pawl axis. The locking mechanism part axis is riveted or caulked with the latch plate, for example, and forms a mounting stabilizing the locking mechanism part. By the formation of the splay in the direction of the locking mechanism part, bracing of the locking mechanism part is possible. Consequently, a closed system and a force progression by the latch plate in the direction of the locking mechanism part and also in the direction of the locking mechanism part by the locking mechanism part axis and into the latch plate can be facilitated. A self-contained stabilizing system is thus provided as a latching system. In particular by means of the splays and in particular the bracing of the locking mechanism in the ratchet position the deformation of the locking plate according to the invention can have an overall stabilizing and resistance-increasing effect on the latching system.

In a further execution form of the invention, the deformation is formed of at least a second splay in the opposite direction to the first splay. Consequently, the deformation demonstrates a cross-sectional profile which can be described as U-shaped. The formation of a U-shaped cross-sectional profile on the periphery of the infeed section additionally stabilizes the latch plate. Furthermore, a smooth contact surface for the locking mechanism parts is advantageously provided by means of the underside of the U-shaped profiling. Underside of the U-shaped deformation means that a first splay starting from the latch plate is oriented in the direction of the locking mechanism parts and a second splay of the deformation is formed in a direction away from the locking mechanism parts. Thus, the closed area of the U-shape lies opposite the locking mechanism parts. The splay is thus adjacent with the closed U-shaped area on the locking parts. Consequently, on the one hand bracing or guiding of the locking mechanism parts can be enabled and on the other hand the smallest possible friction can be formed between the locking mechanism parts and the deformation. By means of the U-shaped formation or splay by first and second splays, a point- or line-shaped contact surface can be provided for the locking mechanism parts.

A further advantage is then attained if at least a groove is molded into the deformation. The deformation is arranged at least in the area of the infeed section, i.e. in the area of the latch plate which corresponds to the latch holder and in which a movement area of the locking mechanism parts is located. If a groove or notch or recess is molded into the deformation according to the invention, the latch plate can thus also experience an increase in resistance. A groove in the deformation can thus be designed by a reduced shape of the deformation. If a deformation is present circumferentially around the inlet area in the latch plate, the shape demonstrates a lesser shape than the rest of the deformation, i.e. a peak of the deformation in the area of the groove. The groove thus forms a recess in the circumferential deformation of the latch plate. An additional increase in resistance can be attained by this additional deformation in the direction of the course of the deformation around the latch plate. A circumferential deformation is thus inserted into the latch plate, whereby the shape, i.e. the peak of the deformation, can vary.

Advantageously, the at least one groove is formed in a contact area of the locking mechanism parts. In the contact area of the locking mechanism parts and in particular in a contact area which corresponds to the ratchet position of the locking mechanism parts in the case of extreme stress, such as an accident, a high, especially a maximum stress is present. Consequently, the groove molded into the deformation enables an additional stabilizing measure to be incorporated into the latch plate. An increased, especially maximized, increase in resistance in the latch plate is also opposed to the increased, especially maximum stress of the latch plate in the engagement area between the locking mechanism part. It is thus possible to attain stability of the latch plate and in particular resistance of the latch plate and thus the latch overall.

Thus, comparative measurements between conventional latch plates and latch plates formed according to the invention, for example, can demonstrate a significant increase in resistance. A resistance test of latching systems takes place, for example, to the extent that the latch is stressed in a y-direction, i.e. in the direction of a flat surface of the latch plate, i.e. in the direction of the locking mechanism and in the direction of the relative movement between the latch holder and the locking mechanism. The experiments have shown that, in the case of conventional latching systems, a failure of the locking mechanism occurred at approximately 17.5 kN. By the insertion of a deformation according to the invention into the latch plate an increase in resistance of more than 50% could be attained. Comparative tests with a latch plate according to the invention thus resulted in a stress limitation of 27.5 kN up to a failure of the latching system. Due to the design of the latch plate according to the invention and in particular due to the insertion of the deformation and/or the groove or grooves into the latch plate the stability of the latching system can be significantly increased. In particular, this increase in resistance can be attained with the least possible material costs and only by a transforming of the latch plate.

In a further execution form of the invention, two, especially more than two grooves arranged behind one another can be molded into the latch plate. Advantageously, the two or more grooves in the insertion direction of the latch holder are arranged behind one another and molded into the deformation. The infeed section of the latch plate is formed by a lower and an upper inlet area. Two grooves arranged behind one another are preferably molded into the deformation and into the lower inlet section of the latch plate. According to the invention, it is naturally also conceivable that a groove can be molded into the upper inlet area and a groove can be molded into the lower inlet area respectively. The insertion of the stabilizing grooves is dependent on the stress and the requirements on the latch plate or the latching system. The grooves are preferably arranged behind one another and in the contact area of the locking mechanism parts.

In one execution form of the invention the latch plate demonstrates at least two different planes, whereby a peak of the groove concurs with at least a latch plate plane. The deformation is arranged circumferentially in the inlet area of the latch plate. The latch plate can thus be formed in such a way that, for example, a first plane is formed in which a locking mechanism part is incorporated and demonstrates a second parallel plane in which a further locking mechanism part is incorporated. Due to the parallel arrangement of the first and second plane, an upper plane and a lower plane can be spoken of if, for example, a cross-sectional shape of the latch plate is viewed. If in an execution form the two splays of the deformations reach into an area of the second, i.e. lower plane of the latch plate, the first splay is thus above the first, i.e. it protrudes beyond the upper plane of the latch plate and extends through the second splay into the second plane of the latch plate. In the area of the groove, in the lower plane the first splay reaches into an area of the upper plane of the latch plate and the second splay reaches to the end of the second and thus lower latch plate plane. Thus, a deformation described as U-shaped is fully present in the latch plate. However, the peak of the U-shaped profiling of the latch plate is different. In particular, the peak of the U-shaped deformation in the area of the groove demonstrates a lesser peak than the remaining part of the deformation.

Advantageously, the deformation can extend along an external periphery of the latch plate. The deformation is preferably arranged in the inlet area of the latch holder. Due to a further deformation, in particular an area of the latch plate adjacent to the inlet area and along an external edge of the latch plate additional stabilization of the latch plate can occur. The deformation is hereby distinguished from the planes molded into the latch plate and/or beads by the deformation being arranged in a peripheral area of the latch plate and preferably being formed as two splays aligned in opposite directions. Due to the formation of the deformation in the latch plate a significant increase in resistance can be attained with the lowest possible material expenditure and extremely cost-effectively. This is especially advantageous as, within the scope of manufacture of the latch plate from a metallic, preferably steel plate, the deformations are molded into the latch plate within the scope of insertion of beads, planes or shapes. Deformation according to the invention can thus be integrated into the manufacturing process of the known latch plates.

Hereinafter the invention is explained in further detail with reference to the attached sketches on the basis of a preferred execution example. However, the principle applies that the execution example does not restrict the invention, but only constitutes an advantageous execution form. The characteristics portrayed can be executed individually or in combination with other characteristics of the description and also the patent claims individually or in combination.

DETAILED DESCRIPTION

Figure 1:
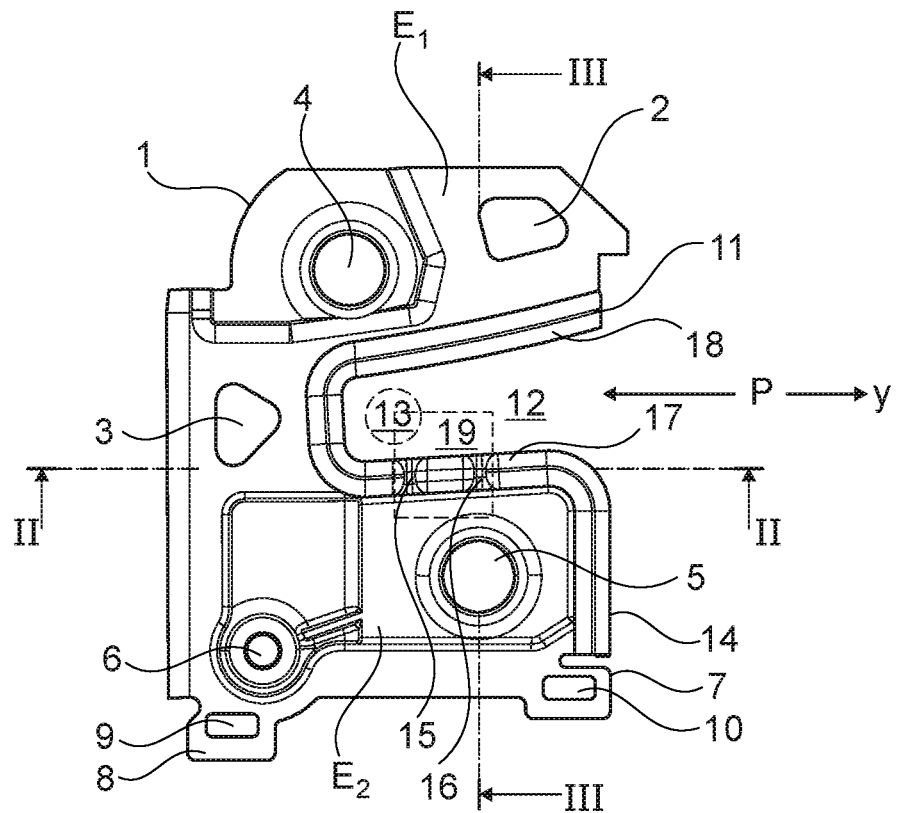
FIG. 1 a top view of a latch plate formed according to the invention detached from a motor vehicle latching system.

FIG. 1 reproduces a latch plate 1 in a top view. The latch plate is formed as a deformed and stamped steel plate part. The latch plate 1 demonstrates recesses 2, 3 which are predominantly for weight reduction purposes. Circular apertures 4, 5 accommodate locking mechanism axes. A further circular aperture 6 serves especially to accommodate a triggering lever and/or to accommodate a spring element. In extensions 7, 8 rectangular stampings 9, 10 are molded, which, for example, can serve to connect to a non-illustrated latch housing and, for example, for connection purposes by means of a clip connection. In this execution form, the latch plate 1 is a latch plate for a back seat rest latch. The latch plate 1 demonstrates at least two parallel planes E1, E2. Deformations 11 are arranged along an inlet area 12 of the latch plate. A latch holder 13 is reproduced in a latching position in engagement with the motor vehicle latch. The latch holder 13 moves in the direction of the arrow P relative to the latch plate 1 and reaches the latching positions illustrated in FIG. 1. The deformation 11 is formed circumferentially around the inlet area 12 and along a partial area of an edge 14 of the latch plate 1. Two grooves 15, 16 are molded into the deformations 11. The grooves 15, 16 are molded in the direction of the arrow P behind one another in a lower inlet area 17 of the infeed section 12. In contrast, the upper inlet area 18 is formed without a groove. The grooves 15, 16 are arranged in a contact area 19 of the locking mechanism parts.

Due to the deformation 11 and the grooves 15, 16 inserted into the deformation 11 the resilience of the latch plate 1 can be significantly increased. If, for example, the latch holder 13 is stressed in the direction of the arrow Y, so that a stress occurs in the Y-direction, the stress of the motor vehicle latch overall can be increased by more than 50%.

Figure 2:
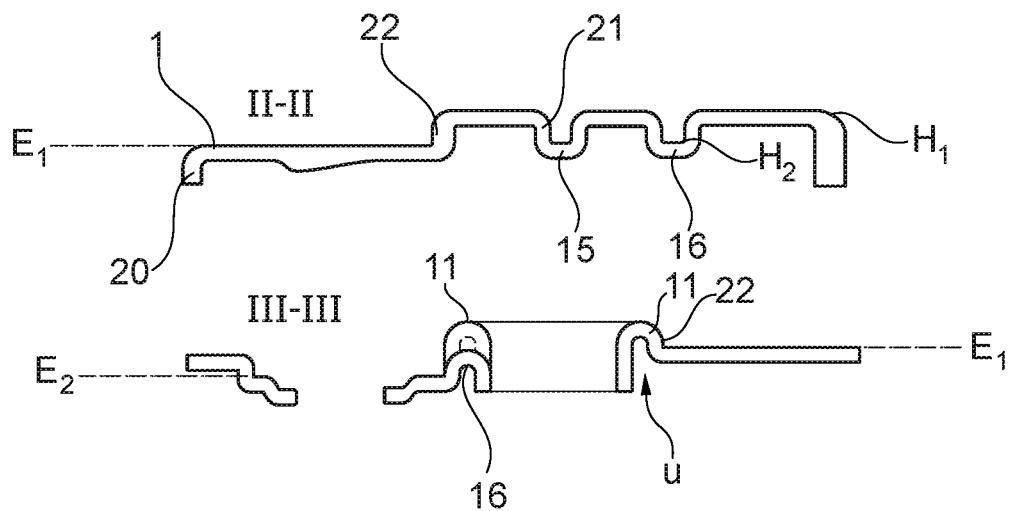
FIG. 2 two cuts through the latch plate illustrated in FIG. 1.

In FIG. 2 and in particular the upper view of FIG. 2 a cut is reproduced along the line II-II from FIG. 1. A cut view through the latch plate 1, is illustrated by the deformation 11 and the grooves 15, 16. As can clearly be recognized, the grooves 15, 16 demonstrate a lesser height H2 than the height H1 of the deformation 11. A splay 20 in an end of the latch plate 1 opposite the inlet area 12 additionally stabilizes the latch plate.

A cut along the line III-III from FIG. 1 is reproduced in FIG. 2. It is clearly apparent that the different planes E1, E2, are arranged parallel to one another. However, they reproduce different height areas of the latch plate 1. It is also apparent that the deformation 11 in the area of the groove 16 demonstrates a greater height H1 than in the area of the groove 16. The second splay 21 ends regardless of the deformation 11 or groove 15, 16 on a uniform height of the plane 2. The first splay 22 is opposite the second splay 21. Consequently, a U-shaped profile is in the plate and can be attained in particular in the inlet area 12.

REFERENCE SIGN LIST

1 Latch plate
2, 3 Recesses
4, 5 Apertures
6 Circular apertures
7, 8 Extension
9, 10 Stampings
11 Deformation
12 Inlet area
13 Latch holder
14 Peripheral area
15, 16 Grooves
17 Lower inlet area
18 Upper inlet area
19 Contact area
20 Splay
21 Second splay
22 First splay
P Arrow
E1 First plane
E2 Second plane
Y Tensile stress
U U-shaped profile

The invention claimed is:
1. A motor vehicle latch comprising:
a locking mechanism,
a latch plate for accommodating the locking mechanism, whereby the latch plate has an inlet area,
whereby a latch holder can be inserted to interact with the locking mechanism in the inlet area
and whereby the latch plate has at least one deformation formed in a peripheral area of the inlet area, the at least one deformation being a bead, wherein the deformation is at least partly arranged directly on an edge of the inlet area, and wherein at least a groove is molded into the deformation and formed in a contact area of the locking mechanism.

2. The motor vehicle latch of claim 1, wherein the deformation is fully arranged on the periphery of the inlet area and encompasses the inlet area.

3. The motor vehicle latch of claim 1, wherein the deformation forms a first splay.

4. The motor vehicle latch of claim 3, wherein the first splay is formed in the direction of the locking mechanism.

5. The motor vehicle latch of claim 3, wherein the deformation is formed from at least a further second splay opposite the first splay so that a cross-sectional profile is formed as a U shape.

6. The motor vehicle latch of claim 1, wherein two or more than two grooves are molded into an insertion direction of the latch holder arranged behind one another into the deformation.

7. The motor vehicle latch of claim 1, wherein the latch plate demonstrates has at least two different planes, whereby a peak of the groove concurs with at least a-one latch plate plane.

8. The motor vehicle latch of claim 1, wherein the deformation extends along an external edge of the latch plate.

9. The motor vehicle latch of claim 4, wherein the deformation is formed from at least a further second splay opposite the first splay so that a cross-sectional profile is formed as a U shape.

10. A motor vehicle latch comprising:

a locking mechanism, a latch plate for accommodating the locking mechanism, whereby the latch plate has an inlet area, whereby a latch holder can be inserted to interact with the locking mechanism in the inlet area and whereby the latch plate has at least one deformation formed in a peripheral area of the inlet area, the at least one deformation being a bead, wherein the deformation is at least partly arranged directly on an edge of the inlet area, wherein at least a groove is molded into the deformation, wherein two or more than two grooves are molded into an insertion direction of the latch holder arranged behind one another into the deformation.

11. The motor vehicle latch of claim 10, wherein the deformation extends continuously around an entire periphery of the inlet area and encompasses the inlet area.

\* \* \* \* \*